Patented Jan. 19, 1937

2,067,912

UNITED STATES PATENT OFFICE 2,067,912

BREAD MANUFACTURE AND COMPOSITIONS OF MATTER FOR USE IN SAME

Charles N. Frey and Alfred Schultz, New York, N. Y., assignors to Standard Brands Incorporated, New York, N. Y., a corporation of Delaware No Drawing. Application June 13, 1930, Serial No. 461,042

17 Claims. (Cl. 99—91)

This invention relates to improvements in the manufacture of leavened bread, and more particularly to novel compositions of the type commonly known as bread improvers, and to methods of using the same.

A general object of the invention is to provide such a composition which may be economically and easily prepared and used; which will not deteriorate under commercial conditions of shipment and storage; and which, when used as herein described in the manufacture of bread, will produce a loaf of improved quality.

A more specific object of the invention is to provide a new and useful bread improver which particularly betters the interior color and increases the absorption and the loaf volume while simultaneously giving a loaf of excellent crust color, texture, odor and taste.

Other objects of the invention will in part be obvious and will in part appear hereinafter.

The invention accordingly comprises the several steps and the relation and order of one or more of such steps with respect to each of the others, and the composition of matter possessing the features, properties, and the relation of constituents, which are exemplified in the following detailed disclosure, and the scope of the application of which will be indicated in the claims.

Numerous suggestions have heretofore been made as to the use of bread improvers in the manufacture of yeast leavened bread, but the particular combination of ingredients herein disclosed has been found, after long and careful experimentation, to produce improved results which have not heretofore been obtained by any of those previously known or suggested for use. These striking results, obtained in accordance with the principles of the present invention, appear to be due to the combined effect of the ingredients used and particularly to the careful proportioning and balancing of such ingredients with respect to each other.

Considered generally, the novel composition of matter comprises the combination of a source of yeast assimilable nitrogen for the yeast, a yeast stimulating agent containing calcium, a dough maturing agent of the oxidizing type, and a natural agent, preferably of the legume type, for improving the interior color and increasing the absorption; such ingredients being so proportioned as to cooperate when used in the manufacture of yeast leavened bread to produce a loaf of particularly high quality.

Although some latitude may be had in the selection of the particular ingredients for each purpose, the following examples are given; the amounts stated for each ingredient indicating the range within which they have been found especially beneficial for use in a dough batch using 300 lbs. of flour:

As a nitrogen source—there may be used ammonium chloride in the amount of from .15 to .3 lb., or the nitrogen equivalent of such an amount of ammonium chloride in the form of other innocuous inorganic or organic salts of ammonia, or in the form of amino acids, or amides.

As a yeast stimulating agent—there may be used calcium sulphate in the amount of from .2 lb. to .4 lb., calcium acid phosphate in the amount of .15 lb. to .3 lb., or an equivalent amount of other suitable source of calcium.

As a dough maturing agent of the oxidizing type—there may be used potassium bromate in the amount of from .0039 lb. to .005 lb., or calcium peroxide in the amount of .001 lb. to .003 lb., or sodium persulphate in the amount of .0015 lb. to .004 lb., or potassium iodate in the amount of .003 lb. to .0045 lb., or other suitable dough maturing agent of the oxidizing type.

As a natural agent of the legume type for improving the interior color and increasing the absorption—there may be used about 1 lb. of ground soy bean or from 1½ lbs. to 2 lbs. of jack bean or 1 lb. to 2 lbs. of *Phascolus aconitifolius*, of vetch, or of *Vicia faba* var. *minor*. These materials not only act to improve the interior color, but help to increase the absorption and the loaf volume and act as fillers, and allow the baker to weigh out the ingredients more quickly than would otherwise be possible.

A preferred formula, which is to be used with 300 lbs. of flour and the yeast and other auxiliary dough ingredients in the manufacture of yeast leavened bread, comprises about 0.15 lb. of ammonium chloride, 0.37 lb. of calcium sulphate, 0.0039 lb. of potassium bromate, and 1 lb. of ground soy bean. The batch is then fermented and baked in the usual manner.

The use of such a composition of matter shortens the dough maturing time, and the dough when baked produces a loaf having excellent crust color, a very light interior, a good texture, taste and odor, and of a volume approximately 5% to 10% higher than the ordinary loaf formed from the same amount of dough. It is to be understood of course that in the above examples mixtures of the sources of nitrogen may be used instead of one source, if desired, and that the same applies to the other groups of ingredients. It is also to be understood that the amounts may be varied in accordance with the strength of the flour, the 300 lbs. being likewise merely by way of example, since with variations in the flour from 200 lbs. to 400 lbs. may be used.

Since, therefore, the objects of this invention have been accomplished, and since certain changes in carrying out the above processes and certain modifications in the composition which embodies the invention may be made without departing from the scope, it is intended that all matter contained in the above description shall be interpreted as illustrative and not in a limiting sense.

Having described our invention, what we claim as new and desire to secure by Letters Patent is:

1. A new composition of matter adapted for use with flour, yeast and other dough ingredients in the manufacture of yeast leavened bread, comprising in combination, a source of yeast assimilable nitrogen, a yeast stimulating agent containing calcium, a dough maturing agent of the oxidizing type, and a natural agent of the legume type acting to improve the interior color and increase the absorption.

2. A new composition of matter adapted for use with flour, yeast and other dough ingredients in the manufacture of yeast leavened bread, comprising in combination, a source of yeast assimilable nitrogen including one of the empirical class consisting of innocuous inorganic or organic salts of ammonia, amino acids, or amides; a yeast stimulating agent comprising a source of calcium; a dough maturing agent including one of the empirical class consisting of a bromate, a peroxide, a persulphate, or an iodate; and a natural agent of the legume type including one of the empirical class consisting of soy bean, jack bean, vetch, *Phascolus aconitifolius* or *Vicia faba* var. *minor*.

3. A new composition of matter adapted for use with flour, yeast and other dough ingredients in the manufacture of yeast leavened bread, comprising in combination, a source of yeast assimilable nitrogen including one of the empirical class consisting of innocuous inorganic or organic salts of ammonia, amino acids, or amides; a yeast stimulating agent including one of the empirical class consisting of calcium sulphate or calcium acid phosphate; a dough maturing agent including one of the empirical group consisting of potassium bromate, sodium peroxide, sodium persulphate or potassium iodate; and a natural agent of the legume type including one of the empirical class consisting of soy bean, jack bean, vetch, *Phascolus aconitifolius* or *Vicia faba* var. *minor*.

4. A new composition of matter adapted for use with flour, yeast and other dough ingredients in the manufacture of yeast leavened bread, comprising in combination, a source of yeast assimilable nitrogen including one of the empirical class consisting of innocuous inorganic or organic salts of ammonia, amino acids, or amides; a yeast stimulating agent including one of the empirical class consisting of calcium sulphate or calcium acid phosphate; a dough maturing agent including one of the empirical group consisting of potassium bromate, sodium peroxide, sodium persulphate or potassium iodate; and a natural agent of the legume type giving improved interior color and increased absorption.

5. A new composition of matter adapted for use with flour, yeast and other dough ingredients in the manufacture of yeast leavened bread, comprising in combination, from 0.15 lb. to 0.3 lb. of ammonium chloride, from .2 lb. to .4 lb. of calcium sulphate, from .0039 lb. to .005 lb. of potassium bromate, and about 1 lb. of soy bean for each 300 lbs. of flour.

6. A new composition of matter adapted for use with flour, yeast and other dough ingredients in the manufacture of yeast leavened bread, comprising in combination, about 0.15 lb. of ammonium chloride, 0.37 lb. of calcium sulphate, 0.0039 lb. of potassium bromate, and 1 lb. of ground soy bean for each 300 lbs. of flour.

7. A process of manufacturing yeast leavened bread, comprising in combination, admixing with the flour, yeast and other auxiliary dough ingredients a source of yeast assimilable nitrogen, a yeast stimulating agent containing calcium, a dough maturing agent of the oxidizing type, and a natural agent of the legume type to improve the interior color and increase the absorption; and fermenting the batch and baking.

8. A process of manufacturing yeast leavened bread, comprising in combination, admixing with the flour, yeast and other auxiliary dough ingredients a source of yeast assimilable nitrogen including one of the empirical class consisting of innocuous inorganic or organic salts of ammonia, amino acids, or amides; a yeast stimulating agent comprising a source of calcium; a dough maturing agent including one of the empirical class consisting of a bromate, a peroxide, a persulphate, or an iodate; a natural agent of the legume type including one of the empirical class consisting of soy bean, jack bean, vetch, *Phascolus aconitifolius* or *Vicia faba* var. *minor*; and fermenting the batch and baking.

9. A process of manufacturing yeast leavened bread, comprising in combination, admixing with the flour, yeast and other auxiliary dough ingredients a source of yeast assimilable nitrogen including one of the empirical class consisting of innocuous inorganic or organic salts of ammonia, amino acids, or amides; a yeast stimulating agent including one of the empirical class consisting of calcium sulphate or calcium acid phosphate; a dough maturing agent including one of the empirical group consisting of potassium bromate, sodium peroxide, sodium persulphate or potassium iodate; a natural agent of the legume type including one of the empirical class consisting of soy bean, jack bean, vetch, *Phascolus aconitifolius* or *Vicia faba* var. *minor*; and fermenting the batch and baking.

10. A process of manufacturing yeast leavened bread, comprising in combination, admixing with the flour, yeast and other auxiliary dough ingredients from 0.15 lb. to 0.3 lb. of ammonium chloride, from .2 lb. to .4 lb. of calcium sulphate, from .0039 lb. to .005 lb. of potassium bromate, and about 1 lb. of soy bean for each 300 lbs. of flour; and fermenting the batch and baking.

11. A process of manufacturing yeast leavened bread, comprising in combination, admixing with the flour, yeast and other auxiliary dough ingredients about 0.15 lb. of ammonium chloride, 0.37 lb. of calcium sulphate, 0.0039 lb. of potassium bromate, and 1 lb. of ground soy bean for each 300 lbs. of flour; and fermenting the batch and baking.

12. A process for producing leavened bread which comprises supplying to a dough batch containing flour, water, yeast and other dough ingredients, an innocuous amid, a natural agent of the legume type, an innocuous salt of calcium, and an innocuous oxidizing salt of a halogen.

13. A bread improving preparation comprising an innocuous amid, a natural agent of the legume type, an innocuous salt of calcium, and an innocuous oxidizing agent.

14. A process for producing leavened bread which comprises supplying to a dough batch containing flour, water, yeast and other dough ingredients, an innocuous amid, soy-bean flour, an innocuous salt of calcium and an innocuous oxidizing agent.

15. A bread improving preparation comprising an innocuous amid, soy-bean flour, calcium sulphate and potassium bromate.

16. A bread improving preparation comprising an innocuous amid, a natural agent of the legume type, calcium sulphate, and sodium persulphate.

17. A process for producing leavened bread which comprises supplying to a dough batch containing flour, water, yeast and other dough ingredients, an innocuous amid, a natural agent of the legume type, an innocuous salt of calcium, and an oxidizing agent.

CHARLES N. FREY.
ALFRED SCHULTZ.